(12) United States Patent
Li et al.

(10) Patent No.: US 11,597,850 B2
(45) Date of Patent: Mar. 7, 2023

(54) INK FLUID SET FOR PRINTING ON OFFSET MEDIA

(71) Applicant: DuPont Electronics, Inc., Wilmington, DE (US)

(72) Inventors: Xiaoqing Li, Newark, DE (US); Christian Jackson, Wilmington, DE (US); C Chad Roberts, Hockessin, DE (US)

(73) Assignee: DUPONT ELECTRONICS, INC., Wilmington, DE (US)

( * ) Notice: Subject to any disclaimer, the term of this patent is extended or adjusted under 35 U.S.C. 154(b) by 284 days.

(21) Appl. No.: 16/954,326

(22) PCT Filed: Dec. 17, 2018

(86) PCT No.: PCT/US2018/066016
§ 371 (c)(1),
(2) Date: Jun. 16, 2020

(87) PCT Pub. No.: WO2019/126042
PCT Pub. Date: Jun. 27, 2019

(65) Prior Publication Data
US 2021/0079245 A1    Mar. 18, 2021

Related U.S. Application Data

(60) Provisional application No. 62/599,994, filed on Dec. 18, 2017.

(51) Int. Cl.
| | | |
|---|---|---|
| *C09D 11/40* | (2014.01) | |
| *C09D 11/033* | (2014.01) | |
| *C09D 11/037* | (2014.01) | |
| *C09D 11/102* | (2014.01) | |
| *C09D 11/106* | (2014.01) | |
| *C09D 11/322* | (2014.01) | |
| *C09D 11/38* | (2014.01) | |
| *C09D 11/54* | (2014.01) | |
| *D21H 19/12* | (2006.01) | |
| *D21H 19/42* | (2006.01) | |
| *D21H 19/82* | (2006.01) | |

(52) U.S. Cl.
CPC ............ *C09D 11/40* (2013.01); *C09D 11/033* (2013.01); *C09D 11/037* (2013.01); *C09D 11/102* (2013.01); *C09D 11/106* (2013.01); *C09D 11/322* (2013.01); *C09D 11/38* (2013.01); *C09D 11/54* (2013.01); *D21H 19/12* (2013.01); *D21H 19/42* (2013.01); *D21H 19/828* (2013.01)

(58) Field of Classification Search
CPC ... C09D 11/322; C09D 11/037; C09D 11/102; C09D 11/00; C09D 11/54; C09D 11/033; C09D 11/38; C09D 11/40; C09D 11/106; C09D 11/326; D21H 19/828; D21H 19/42; D21H 19/12; D06P 1/5285; D06P 1/5278; D06P 1/5242; D06P 1/5264; D06P 5/22
See application file for complete search history.

(56) References Cited

U.S. PATENT DOCUMENTS

| | | |
|---|---|---|
| 4,597,794 A | 7/1986 | Ohta et al. |
| 5,085,698 A | 2/1992 | Ma et al. |
| 5,231,131 A | 7/1993 | Chu et al. |
| 5,554,739 A | 9/1996 | Belmont |
| 6,117,921 A | 9/2000 | Ma et al. |
| 6,262,152 B1 | 7/2001 | Fryd et al. |
| 6,306,994 B1 | 10/2001 | Donald et al. |
| 6,433,117 B1 | 8/2002 | Sheau-Hwa et al. |
| 6,852,156 B2 | 2/2005 | Yeh et al. |
| 10,336,972 B2 * | 7/2019 | Maes .................. C11D 11/0017 |
| 2012/0214939 A1 | 8/2012 | Li et al. |
| 2014/0045975 A1 | 2/2014 | Silver et al. |

FOREIGN PATENT DOCUMENTS

| | | |
|---|---|---|
| EP | 0556649 A1 | 8/1993 |
| EP | 1924738 A1 | 5/2008 |
| WO | 2007/035508 A1 | 3/2007 |
| WO | 2014/039306 A1 | 3/2014 |
| WO | 2015/094564 A1 | 6/2015 |

OTHER PUBLICATIONS

International Search Report for Application No. PCT/US2018/066016; Feldmann, Gabriele, Authorized Officer; EPO; dated Mar. 11, 2019.

* cited by examiner

*Primary Examiner* — An H Do

(57) ABSTRACT

The present disclosure provides an ink fluid set containing an aqueous pretreatment composition and an aqueous inkjet ink. This ink fluid set is particularly suitable for printing on offset coated media.

20 Claims, No Drawings

INK FLUID SET FOR PRINTING ON OFFSET MEDIA

This application claims priority under 35 U.S.C. § 119 from U.S. Provisional Application Ser. No. 62/599,994, filed Dec. 18, 2017.

BACKGROUND OF THE DISCLOSURE

This disclosure pertains to an ink fluid set containing an aqueous pretreatment composition and an aqueous inkjet ink. This ink fluid set is particularly suitable for printing on offset coated media.

Inkjet printing is a non-impact printing process in which droplets of ink are deposited on a substrate, such as paper, to form the desired image. Inkjet printers are equipped with an ink set which, for full color printing, typically comprises a cyan, magenta and yellow ink (CMY). An ink set also typically comprises a black ink (CMYK) with the black ink being the most common ink. However, aqueous inkjet ink is traditionally not suited to print on offset coated media due to limited ink absorbency and surface hydrophobicity of the media. Offset coated media's hydrophobic coating is generally a mixture of polymer resin and additives such as Kaolinite, calcium carbonate, Bentonite, and talc. Coating formula impart certain qualities to the paper including weight, surface gloss, smoothness and low surface porosity. The resultant low porosity means less channels for the ink vehicle to access which results in a greater dependency on ink drying by evaporation. Furthermore, the hydrophobic nature of the coating layers causes reduced wetting out and spreading out of aqueous inks upon printing which can then lead to puddling of ink drops on the media surface. The combined effect of less dot spread and slower drying leads to many more image defects when printing aqueous inks directly on offset media. The most obvious defects include non-uniform deposition of colorants on these media. These non-uniform deposition of colorants defects are known variously as mottle or coalescence or framing or edge of the square effect. Another equally unacceptable outcome due to hydrophobicity and low porosity of offset media is increased drying time of an ink which translates to increased time for adjacent colors to co-mingle leading to inter-color bleed where one color diffuses into its neighboring color.

To overcome these problems, one of the common solutions is to treat the offset coated media with a primer or pre-treatment fluid before printing. Another solution is to incorporate the primer in the paper manufacturing process so the paper is more compatible with inkjet inks. Most of the primers were designed to precipitate or aggregate the ink drops instantly by electrostatic interaction to fix the ink drop in place to prevent coalesces of multiple ink drops. However, this instant fixation of the ink drops usually decreases dot gain in the meantime. As a result, when inks are printed at low resolution or when the inks drops are misplaced, printed images tend to show white space or white lines due to insufficient drop spread.

A need still exists for more stable and reliable pre-treatment compositions that will produce higher quality print images on the print media surfaces. The present disclosure satisfies this need by providing an ink fluid set with a pretreatment composition containing an ink-aggregating agent and an ink-nonaggregating polymer.

SUMMARY OF THE DISCLOSURE

An embodiment provides an inkjet printing fluid set comprising: (a) an aqueous pretreatment composition comprising an ink-aggregating agent, an ink-nonaggregating polymer, and a surfactant; wherein said ink-aggregating agent is one or more members selected from a cationic polymer, a multivalent metal salt, an organic acid, and mixtures thereof and (b) an aqueous inkjet ink comprising a cross-linked polymeric pigment dispersion and an aqueous vehicle, wherein said cross-linked pigment dispersion is made by dispersing said pigment with a polymeric dispersant followed by reaction with a cross-linking agent.

An embodiment provides that the surfactant is selected from the group consisting of cationic, non-ionic, and amphoteric surfactants.

An embodiment provides that the ink-nonaggregating polymer is a waterborne polyurethane dispersion.

An embodiment provides that the said cationic polymer derives from polymerization of diallyldialkyammonium monomers.

An embodiment provides that the multivalent metal salt is the salt of a metal selected from the group consisting of Ca, Ba, Ru, Co, Zn and Ga, and mixtures thereof.

An embodiment provides that the multivalent metal salt is a Ca salt.

An embodiment provides that the fluid set is used for printing on a substrate which is an offset coated media.

An embodiment provides that the fluid set is used for printing on a substrate which is an offset coated cardboard.

An embodiment provides that the cationic polymer is polyalkylamine polymer.

An embodiment provides that the cationic polymer is epichlorohydrin-amine polymer and copolymer derived from epichlorohydrin.

Yet another embodiment provides that the cationic polymer derives from polymerization of quarternized vinylpyridine.

These and other features and advantages of the present embodiments will be more readily understood by those of ordinary skill in the art from a reading of the following Detailed Description. Certain features of the disclosed embodiments which are, for clarity, described above and below as separate embodiments, may also be provided in combination in a single embodiment. Conversely, various features of the disclosed embodiments that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this disclosure pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, the term "dispersion" means a two-phase system wherein one phase consists of finely divided particles (often in a colloidal size range) distributed throughout a bulk substance, the particles being the dispersed or internal phase and the bulk substance being the continuous or external phase.

As used herein, the term "dispersant" means a surface active agent added to a suspending medium to promote uniform and maximum separation of extremely fine solid particles often of colloidal sizes. For pigments, the dispersants are most often polymeric dispersants, and the dispersants and pigments are usually combined using a dispersing equipment.

As used herein, the term "aqueous vehicle" refers to water or a mixture of water and at least one water-soluble, or partially water-soluble (i.e., methyl ethyl ketone), organic solvent (co-solvent).

As used herein, the term "substantially" means being of considerable degree, almost all.

As used herein, the term "dyne/cm" means dyne per centimetre, a surface tension unit.

As used herein, the term "cP" means centipoise, a viscosity unit.

The materials, methods, and examples herein are illustrative only except as explicitly stated, and are not intended to be limiting.

In addition, references in the singular may also include the plural (for example, "a" and "an" may refer to one, or one or more) unless the context specifically states otherwise.

Ink-Nonaggregating Polymer

The pre-treatment solution contains compatible polymeric binder(s) which do not "precipitate" or "crash" with a fixing agent and do not aggregate with the ink. Such polymeric binder(s) are referred to as "ink-nonaggregating polymer". Some suitable compatible ink-nonaggregating polymeric binders include, for example, non-ionic water soluble polymer(s) based on acrylic, urethane, polyester, polyamide, polyvinyl, polyether, polyamine and cellulosic structures, or dispersed polymer(s) which include acrylic latexes, polyurethane dispersions, vinyl acetate copolymer latexes, polyester and polyamide dispersions. These polymers may be made by any known process including, but not limited to, free radical, group transfer, ionic, RAFT, condensation and other types of polymerization.

An ink-nonaggregating polymer can be formed from the incorporation of a nonionic stabilizer either chemically bound or physically absorbed into the polymer. Examples of nonionic reactive components include, ethylene oxide derivatives, acrylamide, hydroxyethyl-substituted monomers, vinylpyrrolidone, ethyleneimines, and the like. The incorporation can occur during the polymerization step, or after the polymerization step which prepares the latex polymer. In the case of an ethylene oxide nonionic component, the substitution can take the form of incorporating a glycol with sufficient $(-CH_2-CH_2O-)_n$ units to impart the nonionic stability. For instance, a polyurethane may have an alkyl polyethylene glycol incorporated into the nonionic polyurethane. The nonionic component can be the main component in nonionic latex polymer, as long as its properties satisfy the stability test described above.

The nonionic latex polymer may also have ionic components incorporated into the polymer. For example, the polyurethanes ionic components, such as acids, may be used in the polyurethane reaction, and a specific acid example is dimethylolpropionic acid. For acylamide and hydroxyethyl substituted nonionic latex polymer, the ionic source can be from (meth)acrylic acids. There are limits to the amounts of ionic components in the nonionic latex polymer, since the ionic components may complex with the ink-aggregating agent that will lead to instability of the nonionic latex polymer/multivalent cationic solution. The balance of non-ionic and ionic components must lead to a stable solution as described above.

When present, the ink-nonaggregating polymer is advantageously used at levels, based on the total weight of ink, of at least about 0.3%, and typically at least about 0.6%. Upper limits are dictated by viscosity or other physical limitations of the pre-treatment fluid. In a more typical embodiment, no more than about 25% ink-nonaggregating polymer is present in the pre-treatment composition, and even most typically no more than about 20%, based on the total weight of the pre-treatment fluid.

Ink-Aggregating Agent

The pre-treatment solution contains an ink-aggregating agent that "precipitates" or "crashes" with a colorant or other ingredient(s) in an ink. Some suitable ink-aggregating agents include cationic polymers and copolymers, multivalent metal salts, and organic acid. The cationic polymers and copolymers in the pretreatment composition attract and fix oppositely charged anionic pigment dispersion and anionic binder molecules to the substrates. There are a greater variety of molecular structures in the cationic family than in any of the others. Such cationic resins may incorporate charge groups in the main polymer backbones, or as side groups in the polymer chains, generally containing quaternary ammonium groups so that the formal positive charge is present irrespective of the pH level. Cationic polymers have also been synthesized which contain sulphonium or phosphonium groups. Weak electrolyte versions are in use which acquire cationic properties in acidic media and are based on polyamines containing primary, secondary or tertiary amino groups, or mixtures of them. The preparative techniques cover polymerizations by chain growth and step growth mechanisms, often in simple aqueous solutions, but also as water-in-oil emulsions, and the modification of existing polymers.

The cationic polymers for use in the pretreatment coating may include, but are not limited to, polymers and copolymers of diallyldialkyammonium monomers such as diallyldimethylammonium chloride, such as polydiallyldimethylammonium chloride (PDADMAC); polymer and copolymers of cationic acrylate and acrylamide such as polyacryloxyethyldimethylammonium chloride or polyacrylamidoethyldimethylammonium chloride; polymers and copolymers of quarternized vinylpyridine such as polymethyl vinylpyridine chloride; polyalkylamine and quaternary ammonium polymers and copolymers; linear and branched polyethyleneimine; polyvinylamine; and polymers and copolymer derived from epichlorohydrin such as epihalohydrin-amine polymers, FLOQUAT® FL2650 of SNF Inc., of France and KYMENE® 557 LX polymers of Ashland Inc, of Wilmington, Del. Co-monomers in such systems may consist of ones which modify the flexibility, hydrophobicity, or mechanical properties of the polymer molecule. In addition, reactive and/or self-condensing monomers may be included to enhance adhesion to the substrate.

There are also naturally occurring polymers that have inherent cationic properties or the polymer can be modified to yield a cationic polyelectrolyte. The most prominent of these is chitosan. Other examples include cationic starch, cationic polymer modified kraft lignin and cationic grafted amylopectin, guar gum and polysaccharides.

"Multivalent" indicates an oxidation state of two or more and, for an element "Z", are typically described as $Z^{2+}$, $Z^{3+}$, $Z^{4+}$ and so forth. For brevity, multivalent cations may be referred to herein as $Z^x$. The multivalent cations are substantially soluble in the aqueous pretreatment solution and preferably exist (in solution) in a substantially ionized state so that they are in a form where they are free and available to interact with textile when the textile is exposed to the pretreatment solution.

$Z^x$ includes, but is not limited to multivalent cations of the following elements: Mg, Ca, Sr, Ba, Sc, Y, La, Ti, Zr, V, Cr, Mn, Fe, Ru, Co, Rh, Ni, Pd, Pt, Cu, Au, Zn, Al, Ga, In, Sb, Bi, Ge, Sn, Pb. In another embodiment, the multivalent cation comprises at least one of Ca, Ba, Ru, Co, Zn and Ga. In yet another embodiment, the multivalent cation comprises at least one of Ca, Ba, Ru, Co, Zn and Ga. Preferably the multivalent cation is Ca.

$Z^x$ can be incorporated into pretreatment solution by addition in a salt form or by addition in an alkaline form and used as a base in the adjustment of the pretreatment solution pH.

The associated anionic material can be chosen from any common anionic material, especially halides, nitrates and sulfates. The anionic form is chosen so that the multivalent cation is soluble in the aqueous pretreatment solution. The multivalent cationic salts can be used in their hydrated form. One or more multivalent cationic salts may be used in the pretreatment solution.

For Ca, the preferred multivalent cation salts are calcium chloride, calcium nitrate, calcium nitrate hydrate and mixtures thereof.

An organic acid as aggregating agent precipitates ink drops by lowering the ink's pH and coagulating pigment dispersion and other ink components. Specific examples of acids are polyacrylic acid, acetic acid, glycolic acid, malonic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid and derivatives of these compounds. Polyacrylic acid and acetic acid are particularly preferred.

Pre-Treatment Composition

An ink-nonaggregating polymer is combined with an ink-aggregating agent to form a pre-treatment solution. The ink-nonaggregating polymer/ink-aggregating agent solution thus formed must be stable as a solution or as a stable emulsion to permit the treatment of coated media. If the ink-nonaggregating polymer gels, or its emulsion precipitates in the presence of an ink-aggregating agent, e.g., a multivalent cationic salt solution, then it cannot be used as a pretreatment additive. A screening test to determine whether an ink-nonaggregating polymer is stable in the presence of an ink-aggregating agent is to mix a 10 wt % polymer (on a dry basis) and a 15 wt % of calcium nitrate tetrahydrate and observe whether the solution/emulsion is stable. The stability is observed at ambient temperature (~25° C.), and at 10 minutes and 24 hours. The ink-nonaggregating polymer component must lead to a stable ink-nonaggregating polymer/multivalent cationic solution/emulsion mixture.

Some suitable compatible ink-nonaggregating polymeric binders include, for example, non-ionic water soluble polymer(s) based on acrylic, urethane, polyester, polyamide, polyvinyl, polyether, polyamine and cellulosic structures, or dispersed polymer(s) which include acrylic latexes, polyurethane dispersions, vinyl acetate copolymer latexes, polyester and polyamide dispersions. These polymers may be made by any known process including, but not limited to, free radical, group transfer, ionic, RAFT, condensation and other types of polymerization.

An ink-nonaggregating polymer can be formed from the incorporation of a nonionic stabilizer either chemically bound or physically absorbed into the polymer. Examples of nonionic reactive components include, ethylene oxide derivatives, acrylamide, hydroxyethyl-substituted monomers, vinylpyrrolidone, ethyleneimines, and the like. The incorporation can occur during the polymerization step, or after the polymerization step which prepares the latex polymer. In the case of an ethylene oxide nonionic component, the substitution can take the form of incorporating a glycol with sufficient $(-CH_2-CH_2O-)_n$ units to impart the nonionic stability. For instance, a polyurethane may have an alkyl polyethylene glycol incorporated into the nonionic polyurethane. The nonionic component can be the main component in nonionic latex polymer, as long as its properties satisfy the stability test described above.

The nonionic latex polymer may also have ionic components incorporated into the polymer. By example, for the polyurethanes ionic components such as acids may be used in the polyurethane reaction and a specific acid example is dimethylolpropionic acid. For the acylamide and hydroxyethyl substituted nonionic latex polymer, the ionic source can be from (meth)acrylic acids. There are limits to the amount of ionic components in the nonionic latex polymer, since the ionic components may complex with the ink-aggregating agent that will lead to instability of the nonionic latex polymer/multivalent cationic solution. The balance of nonionic and ionic components must lead to a stable solution as described above.

When present, the ink-nonaggregating polymer is advantageously used at levels, based on the total weight of ink, of at least about 0.3%, and typically at least about 0.6%. Upper limits are dictated by pre-treatment fluid viscosity or other physical limitations. In a more typical embodiment, no more than about 25% ink-nonaggregating polymer is present in the pre-treatment composition, and even most typically no more than about 20%, based on the total weight of the pre-treatment fluid.

Other optional ingredients in the pre-treatment solution may include, but are not limited to, humectants and biocides. Biocides prevent microbial degradation—their selection and use is generally well known in the art. Suitable humectants are the same as those suitable for use in colored inkjet inks, as discussed in further detail below.

The solution should comprise sufficient ink-aggregating agent content and other ingredients to provide adequate infusion and/or coating of the substrate with the ink-aggregating agent. Typically, the pretreatment will comprise at least about 0.5 wt % of the ink-aggregating agent, and amounts can be used up to the solubility limits of the particularly ink-aggregating agent utilized. Preferably, the pretreatment will comprise from about 1 wt % to about 30 wt % of the ink-aggregating agent. The combined total weight of the ink-nonaggregating polymer and ink-aggregating agent can be up to about 45 wt %.

The Pretreatment composition can further comprise a surfactant. Some suitable surfactants include surfactants that are miscible with amphoteric polymers, i.e., those that do not form precipitates or aggregates when mixing. Some useful surfactants include cationic, non-ionic, and amphoteric surfactants. Some suitable cationic surfactants include, for example, quaternized ammonium or pyridinium surfactants, such as dodecyltrimethylammonium chloride, cetyltrimethylammonium bromide, cetyltrimethylpyridinium chloride and others. Some suitable non-ionic surfactants include ethoxylated acetylene diols (e.g. Surfynol® series from Air Products), ethoxylated primary alcohols (e.g. Neodol® series from Shell) and secondary alcohols (e.g. Tergitol® series from Union Carbide), Pluronic® block copolymer surfactants, sulfosuccinates (e.g. Aerosol® series from Cytec), organosilicones (e.g. Silwet® series from Witco) and fluoro surfactants (e.g. Zonyl® series from DuPont). Amphoteric surfactants that, within a certain pH range, are cationic may also be used. In this case the pH of the liquid composition must be adjusted below the isoelectric point of the surfactant. Some examples of useful zwitterionic surfactants include N,N-dimethyl-N-tetradecyl amine oxide (NTAO), N,N-dimethyl N-hexadecyl amine oxide (NHAO) and related amine oxide compounds. Another example is N-dodecyl-N,N-dimethyl glycine. Yet other examples include phosphates, phosphites, phosphonates, lecithins and the like, and phosphonate esters such as phosphomyelin. Surfactants may be used, typically in the amount of about 0.1 to about 10% and more typically about 0.5 to about 5%, based on the total weight of the pretreatment fluid.

Ink Aqueous Vehicle

Selection of a suitable aqueous vehicle mixture depends on requirements of the specific application, such as the desired surface tension and viscosity, the selected colorant, drying time of the ink, and the type of substrate onto which the ink will be printed. Representative examples of water-soluble organic solvents which may be utilized in the present disclosure are those that are disclosed in U.S. Pat. No. 5,085,698.

If a mixture of water and a water-soluble solvent is used, the aqueous vehicle typically will contain about 30% to about 95% of water with the remaining balance (i.e., about 70% to about 5%) being the water-soluble solvent. Compositions of the present disclosure may contain about 60% to about 95% water, based on the total weight of the aqueous vehicle.

The amount of aqueous vehicle in the ink is typically in the range of about 70% to about 99.8%; more typically, about 80% to about 99.8%, based on total weight of the ink.

Surfactants may be used, typically in an amount of from about 0.01% to about 5%, and specifically from about 0.2% to about 2%, based on the total weight of the ink.

Pigments

The term "pigment" as used herein means an insoluble colorant that requires to be dispersed with a dispersant and processed under dispersive conditions in the presence of a dispersant. The colorant also includes dispersed dyes. The dispersion process results in a stable dispersed pigment.

The selected pigment(s) may be used in dry or wet form. For example, pigments are usually manufactured in aqueous media, and the resulting pigments are obtained as a water-wet presscake. In presscake form, the pigment does not agglomerate to the extent it would in dry form. Thus, pigments in water-wet presscake form do not require as much mixing energy to de-agglomerate in the premix process as pigments in dry form. Representative commercial dry pigments are listed in U.S. Pat. No. 5,085,698.

Some examples of pigments with coloristic properties useful in inkjet inks include: cyan pigments from Pigment Blue 15:3 and Pigment Blue 15:4; magenta pigments from Pigment Red 122 and Pigment Red 202; yellow pigments from Pigment Yellow 14, Pigment Yellow 74, Pigment Yellow 95, Pigment Yellow 110, Pigment Yellow 114, Pigment Yellow 128 and Pigment Yellow 155; red pigments from Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264; green pigments from Pigment Green 1, Pigment Green 2, Pigment Green 7 and Pigment Green 36; blue pigments from Pigment Blue 60, Pigment Violet 3, Pigment Violet 19, Pigment Violet 23, Pigment Violet 32, Pigment Violet 36 and Pigment Violet 38; white pigments such as $TiO_2$ and ZnO; and black pigment carbon black. The pigment names and abbreviations used herein are the "CI" designation for pigments established by Society of Dyers and Colourists, Bradford, Yorkshire, UK and published in *The Color Index*, Third Edition, 1971.

The pigment of the present disclosure can also be a self-dispersing (or self-dispersible) pigment. The term self-dispersing pigment (or "SDP") refers to pigment particles whose surface has been chemically modified with hydrophilic, dispersability-imparting groups that allow the pigment to be stably dispersed in an aqueous vehicle without a separate dispersant. "Stably dispersed" means that the pigment is finely divided, uniformly distributed and resistant to particle growth and flocculation.

The SDPs may be prepared by grafting a functional group or a molecule containing a functional group onto the surface of the pigment, by physical treatment (such as vacuum plasma), or by chemical treatment (for example, oxidation with ozone, hypochlorous acid or the like). A single type or a plurality of types of hydrophilic functional groups may be bonded to one pigment particle. The hydrophilic groups are carboxylate or sulfonate groups which provide the SDP with a negative charge when dispersed in aqueous vehicle. The carboxylate or sulfonate groups are usually associated with monovalent and/or divalent cationic counter-ions. Methods of making SDPs are well known and can be found, for example, in U.S. Pat. Nos. 5,554,739 and 6,852,156, which are incorporated by reference herein, as if fully set forth.

The SDPs may be black, such as those based on carbon black, or may be colored pigments. Examples of pigments with coloristic properties useful in inkjet inks include: Pigment Blue 15:3 and Pigment Blue 15:4 (for cyan); Pigment Red 122 and Pigment Red 202 (for magenta); Pigment Yellow 14, Pigment Yellow 74, Pigment Yellow 95, Pigment Yellow 110, Pigment Yellow 114, Pigment Yellow 128 and Pigment Yellow 155 (for yellow); Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264 (for red); Pigment Green 1, Pigment Green 2, Pigment Green 7 and Pigment Green 36264 (for green); Pigment Blue 60, Pigment Violet 3, Pigment Violet 19, Pigment Violet 23, Pigment Violet 32, Pigment Violet 36 and Pigment Violet 38 (for blue); and carbon black. However, some of these pigments may not be suitable for preparation as SDP. Colorants are referred to herein by their "C. I.".

The SDPs of the present disclosure may have a degree of functionalization wherein the density of anionic groups is less than about 3.5 moles per square meter of pigment surface (3.5 $\mu mol/m^2$), and more specifically, less than about 3.0 $\mu mol/m^2$. Degrees of functionalization of less than about 1.8 $\mu mol/m^2$, and more specifically, less than about 1.5 $\mu mol/m^2$, are also suitable and may be preferred for certain specific types of SDPs.

The range of useful particle size after dispersion is typically from about 0.005 micrometers to about 15 micrometers. Typically, the pigment particle size should range from about 0.005 micrometers to about 5 micrometers; and, specifically, from about 0.005 micrometers to about 1 micrometers. The average particle size as measured by dynamic light scattering is less than about 500 nm, typically less than about 300 nm.

The amount of pigment present in the ink is typically in the range of from about 0.1% to about 25% by weight, and more typically in the range of from about 0.5% to about 10% by weight, based on the total weight of ink. If an inorganic pigment is selected, the ink will tend to contain higher percentages by weight of pigment than with comparable inks employing organic pigment, since inorganic pigments generally have higher densities than organic pigments.

Polymeric Dispersant for Dispersing Pigment

The polymeric dispersant for the non-self-dispersing pigment(s) may be a random or a structured polymer. Typically, the polymer dispersant is a copolymer of hydrophobic and hydrophilic monomers. The "random polymer" means polymers where molecules of each monomer are randomly arranged in the polymer backbone. For a reference on suitable random polymeric dispersants, see: U.S. Pat. No. 4,597,794. The "structured polymer" means polymers having a block, branched, graft or star structure. Examples of structured polymers include AB or BAB block copolymers such as the ones disclosed in U.S. Pat. No. 5,085,698; ABC block copolymers such as the ones disclosed in EP Patent Specification No. 0556649; and graft polymers such as the ones disclosed in U.S. Pat. No. 5,231,131. Other polymeric dispersants that can be used are described, for example, in U.S. Pat. Nos. 6,117,921, 6,262,152, 6,306,994 and 6,433,117, which are incorporated by reference herein, as if fully set forth.

The "random polymer" also includes polyurethanes. Particularly useful are the polyurethane dispersant disclosed in U.S. Patent Application Publication No. 2012/0214939 where the polyurethane dispersant is crosslinked after dispersing a pigment to form a pigment dispersion.

Ink Polymeric Binder

A binder is a polymeric compound or a mixture of polymeric compounds that is added to an ink formulation. The binder can impart properties to the printed material that, for example, gives greater durability to the printed material. Typical polymers used as binders in inkjet inks include poly urethane dispersions and polyurethane solutions, acrylics, styrene acrylics, styrene butadienes, styrene butadiene acrylonitriles, neoprenes, ethylene acrylic acids, ethylene vinyl acetate emulsions, latexes and the like. The binder may be a solution or stabilized as an emulsion by having ionic substituents such as carboxylic acids, sulfur containing acids, amine groups, and other similar ionic groups. Co-stabilizers that are non-ionic in nature, such as that containing polyethylene oxide, may also be present. Alternatively, the binder may be stabilized by external surfactants. The binder can be used singly or in combination with other binders. Typically, the binder is a polyurethane. The binder is typically present in an ink in an amount of at least 0.2% by weight based on the total weight of the ink."

Typically, a binder is different from the polyurethane dispersant described above and is non-reactive to the colorant. The binder is typically added to an ink during the final formulation stage, not during the preparation of a pigment dispersion.

Other Ink Additives

Other ingredients, additives, may be formulated into the inkjet ink, to the extent that such other ingredients do not interfere with the stability and jettability of the inkjet ink. This may be readily determined by routine experimentation by one skilled in the art.

Surfactants are commonly added to inks to adjust surface tension and wetting properties. Suitable surfactants include the ones disclosed in the Vehicle section above. Surfactants are typically used in amounts up to about 3% and more typically in amounts up to 1% by weight, based on the total weight of the ink.

Inclusion of sequestering (or chelating) agents such as ethylenediaminetetraacetic acid, iminodiacetic acid, ethylenediamine-di(o-hydroxyphenylacetic acid), nitrilotriacetic acid, dihydroxyethylglycine, trans-1,2-cyclohexanediaminetetraacetic acid, diethylenetriamine-N,N,N',N'',N''-pentaacetic acid, and glycoletherdiamine-N,N,N',N'-tetraacetic acid, and salts thereof, may be advantageous, for example, to eliminate deleterious effects of heavy metal impurities.

Polymers may be added to the ink to improve durability or other properties. The polymers can be soluble in the vehicle or in a dispersed form, and can be ionic or nonionic. Soluble polymers include linear homopolymers and copolymers or block polymers. They also can be structured polymers including graft or branched polymers, stars and dendrimers. The dispersed polymers may include, for example, latexes and hydrosols. The polymers may be made by any known process including, but not limited to, free radical, group transfer, ionic, condensation and other types of polymerization. They may be made by a solution, emulsion, or suspension polymerization process. Typical classes of polymer additives include anionic acrylic, styrene-acrylic and polyurethane polymer.

When a polymer is present, its level is typically between about 0.01% and about 10% by weight, based on the total weight of an ink. The upper limit is dictated by ink viscosity or other physical limitations.

Ink Sets

The term "ink set" refers to all the individual inks or other fluids an inkjet printer is equipped to jet. Ink sets typically comprise at least three differently colored inks. For example, a cyan (C), magenta (M) and yellow (Y) ink forms a CMY ink set. More typically, an ink set includes at least four differently colored inks, for example, by adding a black (K) ink to the CMY ink set to form a CMYK ink set. The magenta, yellow and cyan inks of the ink set are typically aqueous inks, and may contain dyes, pigments or combinations thereof as the colorant. Such other inks are, in a general sense, well known to those of ordinary skill in the art.

In addition to the typical CMYK inks, an ink set may further comprise one or more "gamut-expanding" inks, including differently colored inks such as an orange ink, a green ink, a red ink and/or a blue ink, and combinations of full strength and light strength inks such as light cyan and light magenta. Such other inks are, in a general sense, known to one skilled in the art.

A typical ink set comprises a magenta, yellow, cyan and black ink, wherein the black ink is an ink according to the present disclosure comprising an aqueous vehicle and a self-dispersing carbon black pigment. Specifically, the colorant in each of the magenta, yellow and cyan inks is a dye.

Ink Properties

Jet velocity, separation length of the droplets, drop size and stream stability are greatly affected by the surface tension and the viscosity of the ink. Pigmented ink jet inks typically have a surface tension in the range of about 20 dyne/cm to about 45 dyne/cm at 25° C. Viscosity can be as high as 30 cP at 25° C., but is typically much lower, more typically less than 10 cP at 25° C. The ink has physical properties compatible with a wide range of ejecting conditions, i.e., driving frequency of the piezo element or ejection conditions for a thermal head for either a drop-on-demand device or a continuous device, and the shape and size of the nozzle. The inks should have excellent storage stability for long periods so as not to clog to a significant extent in an ink jet apparatus. Furthermore, the ink should not corrode parts of the ink jet printing device it comes in contact with, and it should be essentially odorless and non-toxic.

Although not restricted to any particular viscosity range or printhead, the inventive ink fluid set is particularly suited to lower viscosity applications such as those required by thermal printheads. Thus the viscosity of the inventive inks at 25° C. can be less than about 7 cP, typically less than about 5 cP, and more typically than about 3.5 cP. Thermal inkjet actuators rely on instantaneous heating/bubble formation to eject ink drops and this mechanism of drop formation generally requires inks of lower viscosity.

Substrate

The inks of the present disclosure can be printed on common print substrate such as paper and textile. The ink fluid set of the present disclosure are most advantageous for printing on low porosity media such as offset coated media and coated media.

offset coated media and coated media are generally known to have poor receptivity to aqueous ink jet inks. These papers have low surface porosity due to calendaring and/or application of one or more layers of hydrophobic coating layers. Such surface smoothing procedures and coatings provide papers that can withstand the high tack of traditional printing paste and/or be receptive to hydrophobic toner particles. However, the resultant low porosity means less channels for the ink vehicle to access which results in a greater dependency on ink drying by evaporation. Furthermore, the hydrophobic nature of the coating layers causes reduced wetting out and spreading out of aqueous inks upon printing which can then lead to puddling of ink drops on the media surface. The combined effect of less dot spread and slower drying leads to many more image defects when printing aqueous inks directly on offset media. The most obvious defects include non-uniform deposition of colorants on these media. These non-uniform deposition of colorants defects are known variously as mottle or coalescence or framing or edge of the square effect. Another equally unacceptable outcome due to hydrophobicity and low porosity of offset media is increased drying time of an ink which translates to increased time for adjacent colors to co-mingle leading to inter-color bleed where one color diffuses into its neighboring color. These image defects can be mitigated by application of a chemical pre-coating or pre-treatment, often colorless, that interacts with the wet ink drops to immobilize the colorants. Being immobilized chemically, the image defects of non-uniform coloration or movement of colorants in inter-color bleed can be resolved effectively.

Examples

The invention is further illustrated by, but not limited to, the following examples, in which parts and percentages are by weight unless otherwise noted.

Ingredients and Abbreviations

DBTL=dibutyltindilaurate
DMPA=dimethylol propionic acid
IPDI=isophoronediisocyanate
Terathane® 650—a polyether diol from Invista (Wilmington, Del.).

PrintRite® DP375—an ink non-aggregating polymer, polyurethane dispersion from Lubrizol (Wickliffe, Ohio).

FLOQUAT® FL2650—an ink-aggregating cationic polymer from SNF Inc., of France.

Surfynol®440—a nonionic surfactant from Air Products (Allentown, Pa.).

Capstone®FS35—a nonionic fluorosurfactant from the Chemours Company (Wilmington, Del.).

Unless otherwise noted, the above chemicals were obtained from Aldrich (Milwaukee, Wis.) or other similar suppliers of laboratory chemicals.

Dispersant

To a dry, alkali- and acid-free flask equipped with an additional funnel, a condenser and a stirrer, under a nitrogen atmosphere was added Terathane® 650 (300 g), DMPA (180 g), Sulfolane (876 g) and DBTL (0.12 g). The resulting mixture was heated to 60° C. and thoroughly mixed. To this mixture was added IDPI (438 g) via the additional funnel mounted on the flask followed by rinsing any residual IDPI in the additional funnel into the flask with Sulfolane (15 g). The temperature for the reaction mixture was raised to 85° C. and maintained at 85° C. until the isocyanate content reached 0.8% or below. The temperature was then cooled to 60° C. and maintained at 60° C. while Morpholine (30 g) was added via the additional funnel over a period of 5 minutes followed by rinsing the residual Morpholine in the additional funnel into the flask with Sulfolane (5 g). After holding the temperature for 1 hr at 60° C., aqueous KOH (1755 g, 3% by weight) was added over a period of 10 minutes via the additional funnel followed by de-ionized water (207 g). The mixture was maintained at 60° C. for 1 hr and cooled to room temperature to provide a polyurethane dispersant with 25% of solids.

Pigment Dispersion

Cross-linked cyan, magenta and yellow pigment dispersions were prepared using the pigments listed in the Table 1 below and the dispersant prepared above according to methods described in U.S. Patent Application Publication No. 20140045975, which is incorporated by reference herein, as if fully set forth.

TABLE 1

| Pigmented Dispersion | Pigment | Pigment/ Dispersant ratio |
| --- | --- | --- |
| XL-C | TRB2 | 3 |
| XL-M | PR122 | 3 |
| XL-Y | PY74 | 6 |

Ink-Jet Inks

Ink-C and Ink-Y were prepared using crosslinked dispersions XL-C and XL-Y in a standard ink-jet vehicle containing 2-pyrrolidone, glycols and surfactants.

TABLE 2

| Ink | Pigmented Dispersion | Pigment Dispersion Weight % |
| --- | --- | --- |
| Ink-C | XL-C | 2.5 |
| Ink-Y | XL-Y | 4 |

Pretreatment Solutions

Pre-treatment solutions with Calcium Nitrate salts as an ink-aggregating agent and Printrite® DP375 as ink-nonaggregating polymer were prepared and listed in Table 3 below.

TABLE 3

| Component (wt %) | Comparative A | Exp. A | Comparative B | Exp. B | Exp. C |
|---|---|---|---|---|---|
| Calcium Nitrate Tetrahydrate | 6 | 6 | 7.7 | 7.7 | 7.7 |
| Printrite ® DP375 | 0 | 6 | 4 | 4 | 4 |
| Surfynol ® 465 | 0.6 | 0.6 | 0 | 2 | 4 |

Pre-treatment solutions with cationic polymers FLQUART® FL2650 as an ink-aggregating agent were prepared and listed in Table 4 below.

TABLE 4

| Component (wt %) | Comparative C | Exp. D | Exp. E | Exp. F | Exp. G |
|---|---|---|---|---|---|
| FLQUART ® FL2650 | 13 | 13 | 13 | 13 | 13 |
| Printrite ® DP375 | 5 | 5 | 5 | 5 | 5 |
| Surfynol ® 465 |  | 2 | 4 |  |  |
| Capstone ®FS35 |  |  |  | 0.3 | 0.6 |

Coating of the Pretreatment Solution, Printing and Image Quality Evaluation

Two offset media were selected for the study, Oji "Newage Blanc" Matt Art paper supplied by Oji Paper Company, Tokyo, Japan, and UPM Finess Gloss paper supplied by UPM-Kymmene Corp., Helsinki, Finland. One newspaper media, Holmen PLUS 72, supplied by Holmen AB, Sverige, Sweden, was also selected. Pretreatment solutions were applied to the selected media using Pamarco hand ink proofer from Pamarco Global Graphicks, Roselle, N.J., with wet coating weight ranging from 2 to 10 gram/m². After the coating was applied, media was left to dry at room temperature for at least 24 hours before printing.

Two patterns were printed on the designated media with and without pre-treatment coating to obtain 7 cm by 3.5 cm solid primary and secondary print areas of Cyan and Green using the Ricoh Ipsio GX e5500 #4442 with GelSprinter GX e5550N (Raster) print driver. Ink-C and Ink-Y were used for this work.

Image qualities of the prints were quantitatively evaluated with a mottle assessment method using DuPont Appearance Analyzer (DAA). The details of the method are described in U.S. Pat. No. 6,438,256. The DAA analysis yields three different mottle measurements: DuPont Appearance Value (DAV2), DuPont Mottle Measurement (DMM) and DuPont Mottle Value (DMV). The DAV2 is directly calculated from the standard deviation in the gray levels in image divided by the mean gray scale value, and DAV2 is most sensitive to fine or short range mottle. Calculations were adjusted for DMM values to incorporate both fine and larger scale mottle/non-uniformities, and DMV is a further refinement for reproducible measurement despite slight differences in lighting. Calculations for both DMM & DMV are optimized to match visual perception and mottle ratings. For samples with mottle values below 30, DMV is best suited for reproducible and repeatable measurements especially between instruments, but otherwise, DMV and DMM should be considered essentially the same. Therefore only DMM data were recorded. Lower value of DMM indicated less mottle and better image quality. The DAA instrument typically analyzes over an area of 1.99 by 2.66 inches. Unfortunately, the majority of the prints had significant banding, and a smaller region of interest (0.35 by 2.15 inch area) was characterized. The region of DMM data for cyan and green color blocks is summarized in Table 5 below.

TABLE 5

| | Cyan color block | | | Green color block | | |
|---|---|---|---|---|---|---|
| | Treated with Exp. A | Treated with Comparative A | No treatment | Treated with Exp. A | Treated with Comparative A | No treatment |
| OJI "Newage Blance" Matt Art paper | 30 | 314 | 96 | 108 | 175 | 302 |
| UPM Finess Gloss paper | 47 | 236 | 83 | 123 | 224 | 263 |

DMM data indicates that the inventive examples with presence of ink-nonaggregating Printrite™ DP375 polymer and surfactant had better image quality than the comparative example without the polymer and surfactant.

Pretreatment solutions, comparative B, Exp. B and Exp. C, were coated on newspaper media, Holmen PLUS 72, supplied by Holmen AB, Sverige, Sweden, using the same coating process as coating on selected offset media stated above. Holmen PLUS 72 paper with pretreatments and without pretreatment was subsequently printed with a lab printing system. In this printing system, Ink-C was jetted from a mounted stationery Kyocera (Kyoto, Japan) KJ4B printhead onto the paper held to the rotating cylinder underneath. A 5 cm by 2 cm solid color block at a setting of 600×600 dpi was printed and evaluated for color and image quality. Optical Density (OD) values were measured using an X-Rite densitometer. Image Quality (IQ) was examined by observing number of white streaks along the printing direction.

The OD data and image rating on Holmen PLUS 72 are summarized in Table 6 below.

TABLE 6

| Coating | No treatment | Comparative B | Exp. B | Exp. C |
|---|---|---|---|---|
| OD | 0.87 | 0.96 | 0.96 | 0.95 |
| IQ: No. of White streaks | None | Many | None | None |

Prints on top of all coating solutions have higher OD than print on paper without any coating. However comparative B solution resulted in many white streaks as the results of less ink penetration and spreading from ink coagulation. Inventive Exp. B and Exp. C surprisingly showed improved ink coverage with no white streaks while maintaining the higher OD.

Pretreatment solutions, comparative C, Exp. D, Exp. E, Exp. F and Exp. G were coated on offset media, UPM Finess Gloss paper using the same coating process as stated above. A solid block of image was subsequently printed with Ink-C using the Kyocera printhead printing system. Optical Density (OD) values were measured using an X-Rite densitometer. IQ of the solid block was evaluated by rating of the image graininess ranging from 1 to 3. 3 was the best with no visible graininess. 2 indicated moderate graininess. 1 was the worst with patchy image and many white streaks. An image with non joining discrete ink drops was also printed by jetting only 5% of the nozzles. Single ink drop diameter was recorded to measure ink drop's spreading and penetration on the media.

TABLE 7

| | No Treatment | Comparative C | Exp. D | Exp. E | Exp. F | Exp. G |
|---|---|---|---|---|---|---|
| OD | 1.28 | 1.24 | 1.54 | 1.58 | 1.28 | 1.55 |
| Graininess Rating | 1 | 1 | 3 | 3 | 2 | 3 |
| Ink drop diameter (μm) | 62 | 66 | 75 | 74 | 66 | 68 |

As the graininess rating data indicated in Table 7, the inventive examples showed improved image quality. Ink drop size measurements also pointed to improved spreading and wetting with the inventive examples.

What is claimed is:

1. An inkjet printing fluid set comprising:
 a) an aqueous pretreatment composition comprising an ink-aggregating agent, an ink-nonaggregating polymer, and a surfactant; wherein said ink-aggregating agent is one or more members selected from a cationic polymer, a multivalent metal salt, an organic acid and mixtures thereof; and
 b) an aqueous inkjet ink comprising a cross-linked polymeric pigment dispersion and an aqueous vehicle, wherein said cross-linked pigment dispersion is made by dispersing said pigment with a polymeric dispersant followed by reaction with a cross-linking agent.

2. The fluid set of claim 1, wherein said surfactant is selected from the group consisting of cationic, non-ionic, and amphoteric surfactants.

3. The fluid set of claim 2, wherein said ink-nonaggregating polymer is a waterborne polyurethane dispersion.

4. The fluid set of claim 3, wherein said cationic polymer derives from polymerization of diallyldialkyammonium monomers.

5. The fluid set of claim 4, wherein said multivalent metal salt is the salt of a metal selected from the group consisting of Ca, Mg, Ba, Ru, Co, Zn and Ga, and mixtures thereof.

6. The fluid set of claim 5, wherein said multivalent metal salt is a Ca salt.

7. The fluid set of claim 6, wherein said fluid set is used for printing on a substrate which is an offset coated media.

8. The fluid set of claim 6, wherein said fluid set is used for printing on a substrate which is an coated cardboard.

9. The fluid set of claim 3, wherein said cationic polymer is polyalkylamine polymer.

10. The fluid set of claim 9, wherein said multivalent metal salt is the salt of a metal selected from the group consisting of Ca, Mg, Ba, Ru, Co, Zn and Ga, and mixtures thereof.

11. The fluid set of claim 10, wherein said multivalent metal salt is a Ca salt.

12. The fluid set of claim 11, wherein said fluid set is used for printing on a substrate which is an offset coated media.

13. The fluid set of claim 11, wherein said fluid set is used for printing on a substrate which is an offset coated cardboard.

14. The fluid set of claim 3, wherein said cationic polymer is epichlorohydrin-amine polymer and copolymer derived from epichlorohydrin.

15. The fluid set of claim 14, wherein said multivalent metal salt is the salt of a metal selected from the group consisting of Ca, Mg, Ba, Ru, Co, Zn and Ga, and mixtures thereof.

16. The fluid set of claim 15, wherein said multivalent metal salt is the salt of a metal selected from the group consisting of Ca, Mg, Zn and mixtures thereof.

17. The fluid set of claim 14, wherein said multivalent metal salt is a Ca salt.

18. The fluid set of claim 17, wherein said fluid set is used for printing on a substrate which is an offset coated media.

19. The fluid set of claim 17, wherein said fluid set is used for printing on a substrate which is an offset coated cardboard.

20. The fluid set of claim 3, wherein said cationic polymer derives from polymerization of quarternized vinylpyridine.

* * * * *